(12) United States Patent
Gill et al.

(10) Patent No.: US 10,711,320 B2
(45) Date of Patent: Jul. 14, 2020

(54) REDUCTION AT ELEVATED TEMPERATURE OF COATED STEELS CONTAINING METASTABLE AUSTENITE

(71) Applicant: AK Steel Properties, Inc., West Chester, OH (US)

(72) Inventors: Amrinder Singh Gill, West Chester, OH (US); Erik James Pavlina, Lebanon, OH (US); Paul Valdas Janavicius, Wyoming, OH (US)

(73) Assignee: AK Steel Properties, Inc., West Chester, OH (US)

( * ) Notice: Subject to any disclaimer, the term of this patent is extended or adjusted under 35 U.S.C. 154(b) by 0 days.

(21) Appl. No.: 16/296,882

(22) Filed: Mar. 8, 2019

(65) Prior Publication Data
US 2019/0284655 A1    Sep. 19, 2019

Related U.S. Application Data

(60) Provisional application No. 62/642,208, filed on Mar. 13, 2018.

(51) Int. Cl.
| | |
|---|---|
| *C21D 8/00* | (2006.01) |
| *B32B 15/01* | (2006.01) |
| *C23F 17/00* | (2006.01) |
| *C21D 8/02* | (2006.01) |
| *C23C 2/06* | (2006.01) |
| *C23C 2/28* | (2006.01) |
| *C25D 5/36* | (2006.01) |
| *C23C 2/12* | (2006.01) |
| *C21D 8/04* | (2006.01) |
| *C25D 3/22* | (2006.01) |

(52) U.S. Cl.
CPC ............. *C21D 8/00* (2013.01); *B32B 15/013* (2013.01); *C21D 8/0231* (2013.01); *C21D 8/0284* (2013.01); *C21D 8/0431* (2013.01); *C23C 2/06* (2013.01); *C23C 2/12* (2013.01); *C23C 2/28* (2013.01); *C23F 17/00* (2013.01); *C25D 5/36* (2013.01); *C21D 2211/001* (2013.01); *C21D 2211/008* (2013.01); *C25D 3/22* (2013.01)

(58) Field of Classification Search
CPC ............ B32B 15/013; C21D 2211/001; C21D 2211/008; C21D 8/00; C21D 8/0231; C21D 8/0284; C21D 8/0431; C23C 2/06; C23C 2/12; C23C 2/28; C23F 17/00; C25D 3/22; C25D 5/36
See application file for complete search history.

(56) References Cited

U.S. PATENT DOCUMENTS

| | | |
|---|---|---|
| 3,599,320 A | 8/1971 | Brickner et al. |
| 10,214,790 B2 | 2/2019 | Evertz et al. |
| 2016/0281196 A1 | 9/2016 | Huang et al. |
| 2017/0204493 A1 | 7/2017 | Gill |

FOREIGN PATENT DOCUMENTS

| | | | |
|---|---|---|---|
| EP | 2 383 353 | | 11/2011 |
| JP | 09103803 A | * | 4/1997 |
| JP | 2010089096 A | * | 4/2010 |
| WO | WO 2013/124283 | | 8/2013 |
| WO | WO 2017/124081 | | 7/2017 |

OTHER PUBLICATIONS

Angel, Tryggve. "Formation of martensite in austenitic stainless steels." J. Iron Steel Inst. 177 (1954): 165-174.
Nohara, Kiyohiko, Yutaka Ono, and Nobuo Ohashi. "Composition and grain size dependencies of strain-induced martensitic transformation in metastable austenitic stainless steels." Tetsu-to-Hagané 63.5 (1977): 772-782.
International Search Report and Written Opinion dated Apr. 4, 2019 for Application No. PCT/US2019/021392, 9 pages.

* cited by examiner

*Primary Examiner* — Jenny R Wu
(74) *Attorney, Agent, or Firm* — Frost Brown Todd LLC

(57) ABSTRACT

Warming a metastable steel after coating and before or during cold rolling suppresses the transformation of austenite to martensite, resulting in lower mill loads and higher amounts of reduction at similar loads. As-warm rolled steel has enhanced mechanical properties when compared to steel reduced the same amount by cold rolling at room temperature.

9 Claims, 5 Drawing Sheets

REDUCTION AT ELEVATED TEMPERATURE OF COATED STEELS CONTAINING METASTABLE AUSTENITE

PRIORITY

This application claims priority to U.S. Provisional Application Ser. No. 62/642,208, entitled REDUCTION AT ELEVATED TEMPERATURE OF COATED STEELS CONTAINING METASTABLE AUSTENITE, filed on Mar. 13, 2018, the disclosure of which is incorporated by reference herein.

BACKGROUND

The present invention pertains to steels containing a significant amount of metastable austenite (5%-100%). Austenite is deemed metastable if it transforms to martensite upon mechanical deformation. Such martensite is called deformation-induced martensite, which is stable until the steel is heated to high temperatures upon which the martensite reverts to austenite.

Due to the high work hardening rates associated with the deformation-induced transformation of metastable austenite to martensite, steels containing metastable austenite are sometimes rolled at ambient—or greater—temperatures to achieve high yield and tensile strengths.

If such a steel, in a rolled condition, was to be coated for protection against corrosion, then the high strength of the rolled steel introduces unique challenges during the coating process because coating lines have typically been designed for lower strength steel products. The increased strength causes challenges related to the ability to pull the strip through the line, the ability to bend the strip around rolls, and the ability to perform any shape correction by way of tension leveling or other means.

Furthermore, in some coating techniques, the steel strip is subjected to high temperatures, which result in some or all of the deformation-induced martensite reverting back to austenite. As a result of this reversion, the mechanical properties of the steel strip would degrade, thereby losing the beneficial effects of the earlier rolling process.

SUMMARY

Cold rolling of steels containing metastable austenite can be challenging due to the deformation-induced transformation of metastable austenite to a higher strength martensite phase. Cold rolling of such steel leads to a significant increase in mill loads and the steel often needs to undergo annealing(s) to partially or fully recover or recrystallize the austenite-containing microstructure before further cold reduction can be performed.

To overcome the above identified challenges, it is advantageous to coat such metastable steels in a partially or fully annealed condition, prior to rolling. Here, annealing can also refer to inter-critical annealing or austenitizing. In such annealed condition, the material will have lower strength and hardness, making it easier to process through a coating line. Additionally, any exposure to the thermal profile of a coating line should not degrade the properties to any significant extent.

The present process involves coating steels containing metastable austenite in an annealed condition followed by warm rolling. Warm rolling involves warming the material to temperatures greater than ambient conditions before or during rolling in order to suppress the transformation of austenite to martensite. Warm rolling can result in lower mill loads and higher amounts of reduction at similar loads because of the lower flow strength and increased ductility of the steel at temperatures greater than ambient conditions. The ability to achieve greater reductions can also lead to fewer intermediate anneals being required before the steel can be processed to final gauge.

Surprisingly, as-warm rolled steel has shown enhanced mechanical properties when compared to steel reduced to the same amount by cold rolling. Warm rolling followed by subsequent annealing also results in better mechanical properties than achieved in steel cold rolled by the same amount and annealed. The benefits of warm rolling can be achieved at moderate temperatures and also without requiring extensive line modifications.

DETAILED DESCRIPTION

Figure 1:
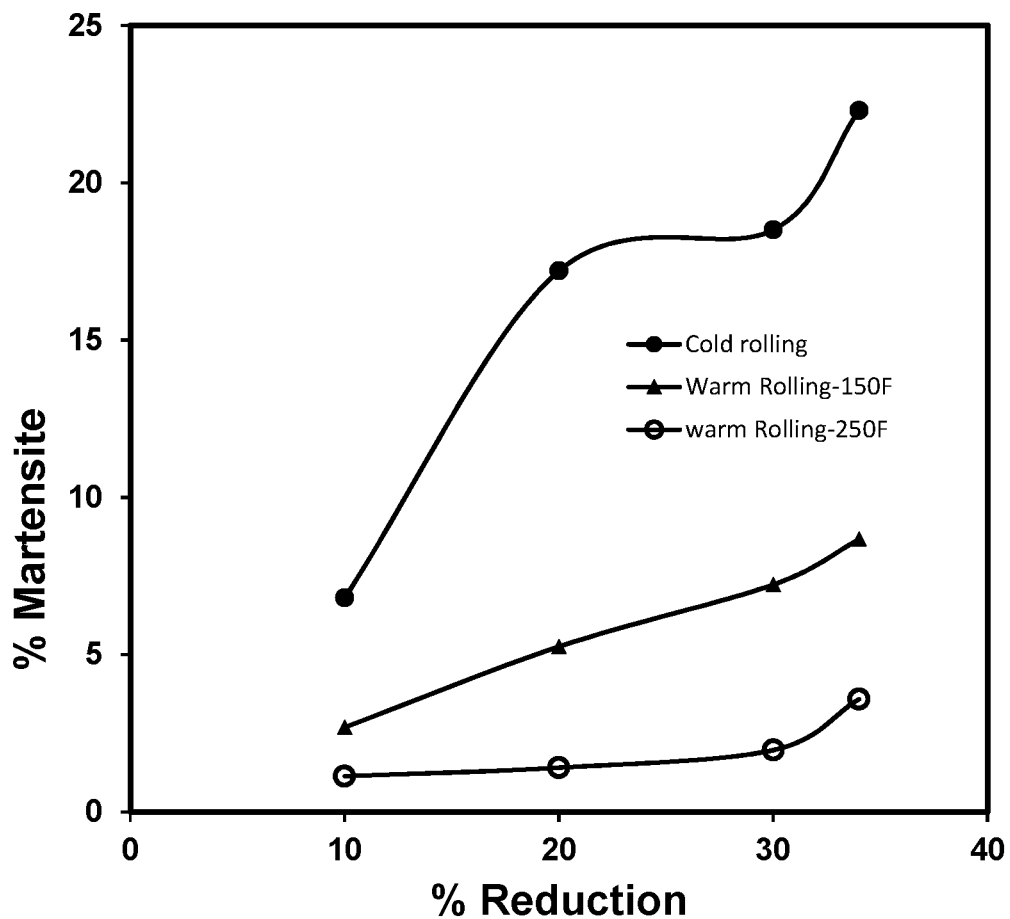
FIG. 1 depicts percent martensite in a metastable steel as a function of percent reduction resulting from warm rolling and cold rolling.

The present invention pertains to steels containing significant amounts of metastable austenite (5%-100% austenite), referred to as "metastable steel." Austenite is deemed metastable if it transforms to martensite upon mechanical deformation. Such martensite is called deformation-induced martensite. Deformation-induced martensite is a stable constituent until the steel is exposed to elevated temperatures. Steels containing such metastable austenite can be carbon steel or stainless steel.

There are several ways to characterize the stability of austenite. One way is to calculate an Instability Factor (IF) of the austenite based on its chemical composition. This factor was described in U.S. Pat. No. 3,599,320 (the disclosure of which is incorporated herein by reference), which defines IF as:

$$IF=37.193-51.248(\% \text{ C})-0.4677(\% \text{ Cr})-1.0174(\% \text{ Mn})-34.396(\% \text{ N})-2.5884(\% \text{ Ni}) \qquad \text{Equation 1}$$

Steels with calculated IF values from 0-2.9 are categorized as "slightly metastable" and steels with IF greater than 2.9 are categorized as "moderately metastable". The methods of the present invention have the most significance for steel containing metastable austenite with an IF greater than 2.9.

Another technique to characterize the stability of austenite is to calculate or measure what is known as the $M_d30$ temperature. For a given metastable steel composition, on deformation to 0.3 true strain at the $M_d30$ temperature, 50% of the austenite transforms to martensite. For a given metastable steel composition, the $M_d$ temperature is the temperature above which no martensite is formed upon deformation. $M_d$ and $M_d30$ temperatures are well-known in the art. In addition to being empirically determined, the $M_d30$ temperature for a particular steel composition can also be calculated by one of the several equations that can be found in literature, including the following:

As taught by Nohara, K., Ono, Y. and Ohashi, N. 1977. Composition and Grain-Size Dependencies of Strain-Induced Martensitic Transformation in Metastable Austenitic Stainless Steels. Journal of Iron and Steel Institute of Japan, 63 (5), pp. 212-222 (the disclosure of which is incorporated herein by reference):

$$M_d30=551-462(\% \text{ C}+\% \text{ N})-68*\% \text{ Cb}-13.7*\text{Cr}-29(\% \text{ Cu}+\% \text{ Ni})-8.1*\% \text{ Mn}-18.5*\% \text{ Mo}-9.2*\% \text{ Si} \quad \text{Equation 2}$$

As taught by Angel, T. 1954. Formation of Martensite in Austenitic Stainless Steels. Journal of the Iron and Steel Institute, 177 (5), pp. 165-174 (the disclosure of which is incorporated herein by reference):

$$M_d30=413-462*(\% \text{ C}+\% \text{ N})-13.7*\% \text{ Cr}-8.1*\% \text{ Mn}-18.5*\% \text{ Mo}-9.5*\% \text{ Ni}-9.2*\% \text{ Si} \quad \text{Equation 3}$$

A low stability indicates that the austenite easily transforms to martensite with deformation and that it readily transforms to martensite at low strains. Conversely, a high stability indicates that austenite is resistant to the deformation-induced transformation to martensite and that large strains are required to appreciably transform any austenite to martensite. A low instability is indicated by a high $M_d30$ temperature—that is, austenite is more unstable as the $M_d30$ temperature increases. The $M_d30$ temperature in metastable austenite is above the $M_s$ temperature (that is, the martensite start temperature of athermal martensite).

Steels with significant amounts of metastable austenite work harden rapidly as austenite transforms to higher strength martensite. Cold rolling of such steels remains a challenge as a greater extent of transformation can result in loads exceeding the capability or capacity of the rolling mill. Such steels then need to be annealed to partially or fully transform some or all of the martensite to austenite or other lower strength constituents before the steels can be rolled further. If the transformation of austenite to martensite can be suppressed during rolling, then the steel can be rolled to thinner gauges with lower mill loads. One way to suppress such transformation is to warm the steel prior to or during cold rolling. Here, warming refers to heating the steel to temperatures greater than ambient conditions but less than approximately 930° F. or 499° C. Warm rolling has shown to have additional benefit resulting in better mechanical properties. Warm rolling is described in U.S. patent application Ser. No. 15/407,992, entitled "Warm Rolling of Steels Containing Metastable Austenite," filed Jan. 17, 2017, the contents of which are incorporated herein by reference.

Such steels might be coated to prevent corrosion. Typical coatings for steel may be zinc or zinc-based alloys, aluminum or aluminum- or aluminum-silicon-based alloys, or any other metal coatings known in the art to be applied to steel.

In steels that have work hardened considerably, coating becomes challenging due to two main factors:

1. The ability of coating line equipment to handle high strength material; and
2. The exposure of the steel strip to high temperatures in hot-dip coating processes which may result in the reversion of some or all of the martensite back to low strength austenite, resulting in lower yield strength and tensile strength.

One way to retain the high strength in such steels is to coat such steels in an annealed condition, or other condition where no deformation induced martensite is present and subsequently warm roll such steels.

One embodiment involves performing a cold or warm rolling operation on a hot rolled strip, followed by annealing to achieve a material that has no or very little deformation-induced martensite and has a recrystallized microstructure. This rolling is followed by a coating operation such as hot-dip aluminizing, hot-dip galvanizing, or electro-galvanizing. Coating is followed by rolling such metastable steels at temperatures above room temperature (approximately 70° F. or 21° C.) and, in some embodiments, close to or above the $M_d$ temperature of the steel.

The coils of such material can be warmed in ways that will be apparent to one of skill in the art, including one of or a combination of the following methods:

I. Warming the coil in a furnace/oven prior to placing the coil at the rolling line.

II. Warming the coated coil at the rolling mill using some type of in-line heating system, such as induction heaters or radiant heaters, prior to entry into the first stand of the cold mill;

III. Warming the coolant used at the rolling mill. Warming of the coolant may be performed in several ways such as turning off the cooling tower on the rolling mill and running some other material to warm up the coolant. Other methods of warming the coolant prior to rolling will be apparent to those of skill in the art; and IV. Warming or heating the rolls of the cold mill using embedded heaters or other means.

The metastable steel can be melt, cast, hot rolled, and annealed prior to coating and cold rolling (if applicable) in accordance with typical metal-making processing for the particular composition. In some embodiments, after coating and before cold rolling, the steel is warmed to a temperature no greater than 250° F. or 121° C.; in other embodiments, the steel is warmed to a temperature no greater than 930° F. or 499° C. In other embodiments, the metastable steel is warmed to a temperature near or above the $M_d$ temperature for the particular metastable steel composition. And in other embodiments, the metastable steel is warmed to a temperature near or above the $M_d30$ temperature for the particular metastable steel composition. Such warm rolling passes can be one or more of the first, second, or any subsequent "cold rolling" steps.

FIG. 1 compares the effect of rolling temperature on the extent of deformation-induced martensite formation during rolling of a steel containing metastable austenite. For the same amount of reduction, significantly less martensite is formed for each warm rolling condition as compared to the cold rolled steel which was rolled at room temperature. The benefits of warm rolling in reducing the amount of martensite formed can even be observed at relatively low temperatures (150° F. or 66° C. in this case), and less martensite is formed as the warm rolling temperature increases.

Figure 2:
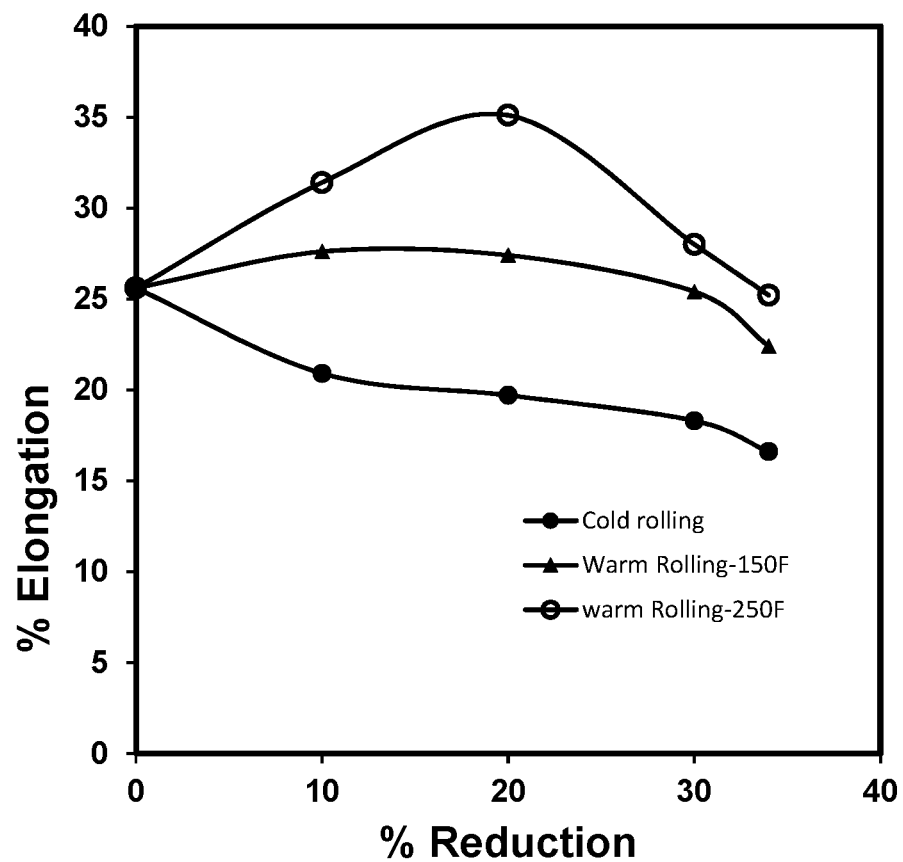
FIG. 2 depicts percent elongation in a metastable steel as a function of percent reduction resulting from cold rolling and warm rolling.

FIG. 2 shows the total elongation of a steel containing metastable austenite, after warm rolling and cold rolling. Surprisingly, warm rolling results in an initial increase in the total elongation before decreasing. These results indicate that the benefits of warm rolling can be tailored by either varying the amount of reduction performed at a temperature or by varying the rolling temperature. Conversely, cold rolling always results in a decreased total elongation as the amount of reduction increases.

Example 1

An annealed steel containing metastable austenite was electrogalvanized with a zinc-rich coating and then either cold rolled at room temperature (approximately 21° C.) or warm rolled at 270° F. or 132° C. Table 1 summarizes the as-coated properties and properties after rolling.

TABLE 1

| Reduction (%) | Temperature (° C.) | Yield Strength (MPa) | Ultimate Tensile Strength (MPa) | Total Elongation (%) | Strength-Ductility Product (MPa · %) |
|---|---|---|---|---|---|
| 0 | — | 383 | 1005 | 27.1 | 27236 |
| 10 | 21 | 671 | 1036 | 13.5 | 13989 |
| 10 | 21 | 651 | 1030 | 12.2 | 12560 |
| 20 | 21 | 866 | 1287 | 11.3 | 14546 |
| 20 | 21 | 895 | 1242 | 8.7 | 10808 |
| 30 | 21 | 1105 | 1444 | 7.3 | 10538 |
| 30 | 21 | 1070 | 1402 | 6.4 | 8973 |
| 35 | 21 | 1173 | 1442 | 5.4 | 7789 |
| 35 | 21 | 1168 | 1441 | 5.4 | 7781 |
| 10 | 132 | 622 | 958 | 15.6 | 14940 |
| 10 | 132 | 603 | 927 | 13.3 | 12329 |
| 20 | 132 | 837 | 1135 | 13.4 | 15204 |
| 20 | 132 | 825 | 1143 | 13.5 | 15432 |
| 30 | 132 | 971 | 1297 | 13.1 | 16984 |
| 30 | 132 | 990 | 1300 | 15.8 | 20538 |
| 35 | 132 | 1059 | 1344 | 11.0 | 14783 |
| 35 | 132 | 1086 | 1361 | 13.8 | 18782 |

Figure 3:
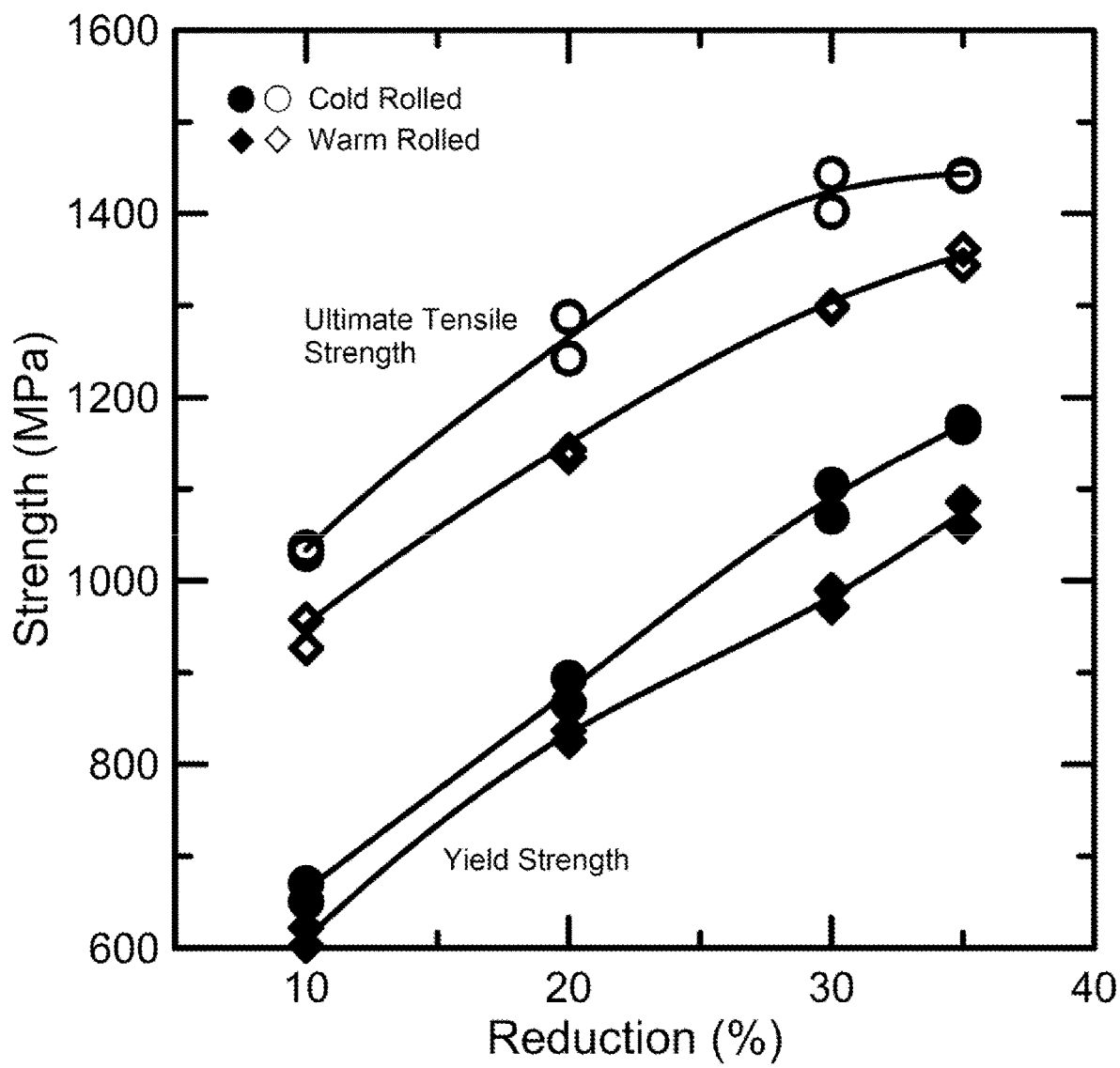
FIG. 3. depicts yield strength and ultimate tensile strength as a function of reduction for cold rolling and warm rolling.
Figure 4:
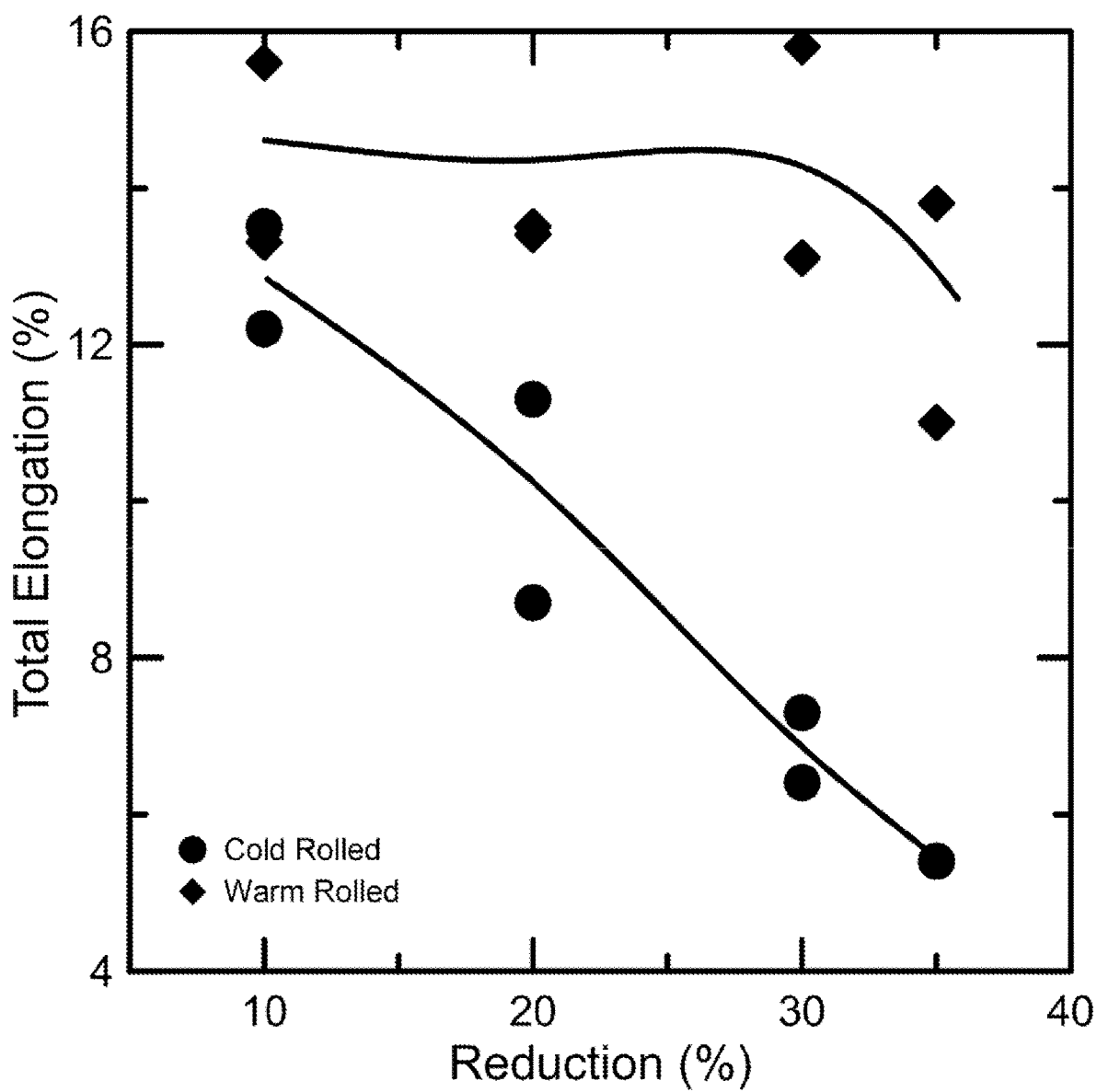
FIG. 4 depicts total elongation as a function of reduction for cold rolling and warm rolling.
Figure 5:
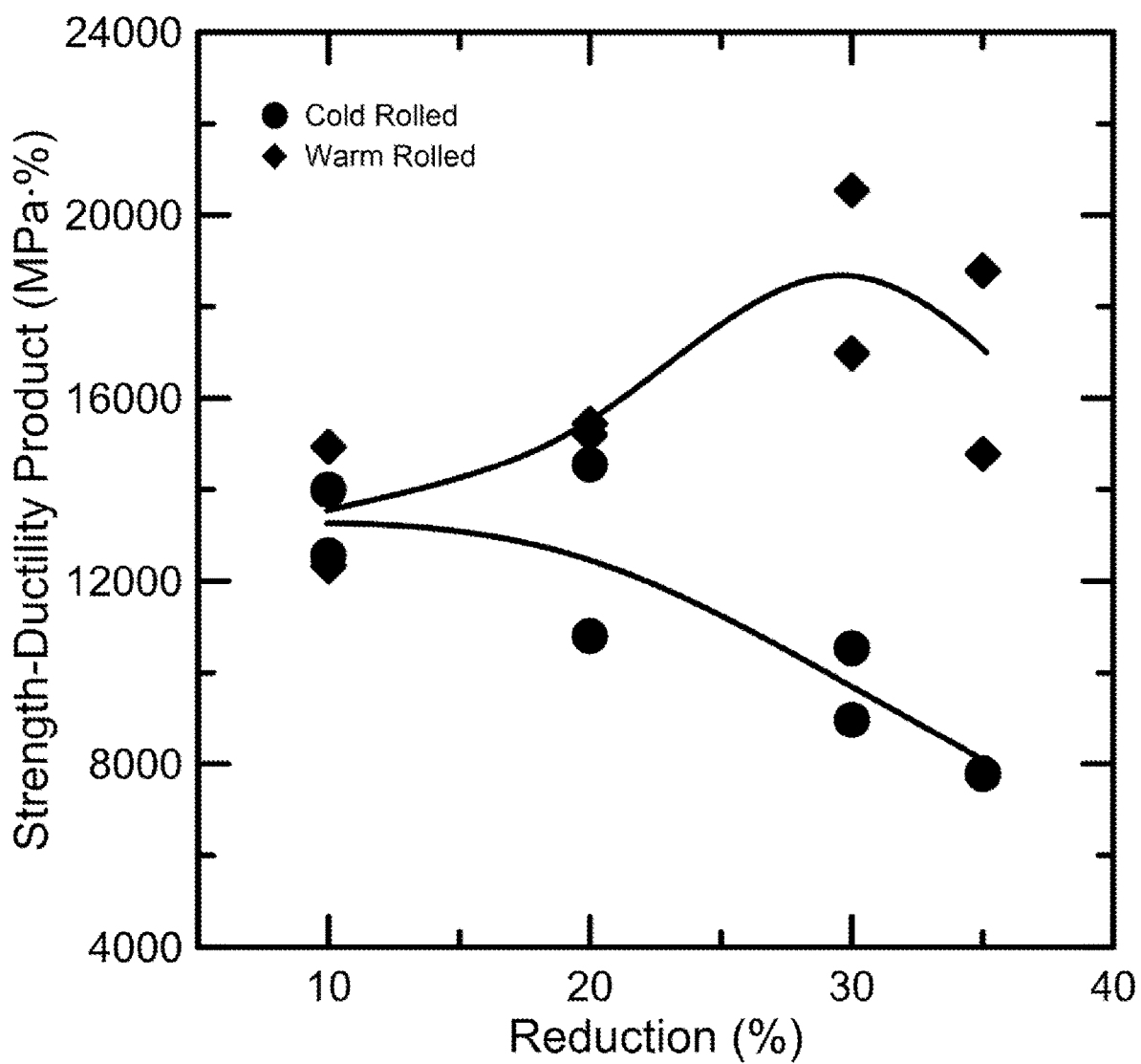
FIG. 5 depicts strength-ductility product (product of ultimate tensile strength and total elongation) as a function of reduction for cold rolling and warm rolling.

FIG. 3 shows that for both cold rolling and warm rolling, the yield strength and ultimate tensile strength increase as the rolling reduction increases. FIG. 4 demonstrates that elongation decreases as the reduction increases for cold rolling. Surprisingly, the elongation after warm rolling is largely unchanged with reduction up to an approximately 30% reduction, after which it decreases slightly. This beneficial effect of warm rolling is further shown in FIG. 5, which compares the strength-ductility product (the product of ultimate tensile strength and total elongation) for cold rolled and warm rolled coated specimens. The effects of rolling on the strength-ductility product are similar to those on total elongation. The strength-ductility product decreases as reduction increases for cold rolling. However, the strength-ductility product increases as a result of warm rolling for reductions up to approximately 30%.

Example 2

A metastable steel was prepared according to the following process:
 a. Selecting a metastable steel having an instability factor (IF) greater than or equal to 2.9, wherein IF is calculated by the following equation:

IF=37.193−51.248(% C)−0.4677(% Cr)−1.0174(% Mn)−34.396(% N)−2.5884(% Ni)

b. Prior to coating said metastable steel, annealing said metastable steel;
 c. After coating said metastable steel, warming said metastable steel to a warming temperature greater than 70° F.; and
 d. Rolling said coated and warmed metastable steel.

Example 3

A metastable steel was prepared in accordance with the process of Example 2, wherein the warming temperature is near or above the $M_d$ temperature for the particular metastable steel composition.

Example 4

A metastable steel was prepared in accordance with the process of Example 2, wherein the warming temperature is near or above the $M_d30$ temperature for the particular metastable steel composition.

Example 5

A metastable steel was prepared in accordance with the process of Example 2, wherein the warming temperature is less than or equal to 930° F.

Example 6

A metastable steel was prepared in accordance with the process of Example 2, wherein the warming temperature is less than or equal to 250° F.

Example 7

A metastable steel was prepared in accordance with the process of Example 4, wherein the $M_d30$ temperature for the metastable steel is calculated according to the following equation:

$$M_d30=551-462(\% \text{ C}+\% \text{ N})-68*\% \text{ Cb}-13.7*\text{Cr}-29(\% \text{ Cu}+\% \text{ Ni})-8.1*\% \text{ Mn}-18.5*\% \text{ Mo}-9.2*\% \text{ Si}.$$

Example 8

A metastable steel was prepared in accordance with the process of Example 4, wherein the $M_d30$ temperature for the metastable steel is calculated according to the following equation:

$$M_d30=413-462*(\% \text{ C}+\% \text{ N})-13.7*\% \text{ Cr}-8.1*\% \text{ Mn}-18.5*\% \text{ Mo}-9.5*\% \text{ Ni}-9.2*\% \text{ Si}$$

Example 9

A metastable steel was prepared in accordance with the process of Example 2, 3, 4, 5, 6, 7, or 8, further comprising the step of wherein after rolling, the metastable steel is further rolled at room temperature.

Example 10

A metastable steel was prepared in accordance with the process of Example 2, 3, 4, 5, 6, 7, or 8, further comprising the step of wherein after rolling, the metastable steel is further annealed.

Example 11

A metastable steel was prepared in accordance with the process of Example 10, further comprising the step of wherein after annealing, the metastable steel is further rolled at room temperature.

Example 12

A metastable steel was prepared in accordance with the process of Example 10, further comprising the step of wherein after annealing, the metastable steel is further warm rolled.

Example 13

A metastable steel was prepared in accordance with the process of Example 12, wherein the warming temperature for the further warm rolling step is near or above the $M_d$ temperature for the particular metastable steel composition.

Example 14

A metastable steel was prepared in accordance with the process of Example 12, wherein the warming temperature for the further warm rolling step is near or above the $M_d30$ temperature for the particular metastable steel composition.

Example 15

A metastable steel was prepared in accordance with the process of Example 12, wherein the warming temperature for the further warm rolling step is less than or equal to 930° F.

Example 16

A metastable steel was prepared in accordance with the process of Example 12, wherein the warming temperature for the further warm rolling step is less than or equal to 250° F.

Example 17

A metastable steel was prepared in accordance with the process of Example 14, wherein the $M_d30$ temperature for the metastable steel for the further warm rolling step is calculated according to the following equation:

$$M_d30=551-462(\% \text{ C}+\% \text{ N})-68*\% \text{ Cb}-13.7*\text{Cr}-29(\% \text{ Cu}+\% \text{ Ni})-8.1*\% \text{ Mn}-18.5*\% \text{ Mo}-9.2*\% \text{ Si}.$$

Example 18

A metastable steel was prepared in accordance with the process of Example 14, wherein the $M_d30$ temperature for the metastable steel for the further warm rolling step is calculated according to the following equation:

$$M_d30=413-462*(\% \text{ C}+\% \text{ N})-13.7*\% \text{ Cr}-8.1*\% \text{ Mn}-18.5*\% \text{ Mo}-9.5*\% \text{ Ni}-9.2*\% \text{ Si}.$$

What is claimed is:

1. A method of coating a metastable steel comprising the steps of:
   a. Selecting a metastable steel having an instability factor (IF) greater than or equal to 2.9, wherein IF is calculated by the following equation:

$$IF=37.193-51.248(\% \text{ C})-0.4677(\% \text{ Cr})-1.0174(\% \text{ Mn})-34.396(\% \text{ N})-2.5884(\% \text{ Ni})$$

b. Prior to coating said metastable steel, annealing said metastable steel;
   c. Coating said metastable steel with a metallic coating;
   d. After coating said metastable steel, warming said metastable steel to a warming temperature greater than 70° F.; and
   e. Rolling said coated and warmed metastable steel.

2. The method of claim 1, wherein the warming temperature is near or above the Md temperature for the particular metastable steel composition.

3. The method of claim 1, wherein the warming temperature is near or above the Md30 temperature for the particular metastable steel composition.

4. The method of claim 1, wherein the warming temperature is less than or equal to 930° F.

5. The method of claim 3, wherein the Md30 temperature for the metastable steel is calculated according to the following equation:

$$Md30=551-462(\% \text{ C}+\% \text{ N})-68*\% \text{ Cb}-13.7*\text{Cr}-29(\% \text{ Cu}+\% \text{ Ni})-8.1*\% \text{ Mn}-18.5*\% \text{ Mo}-9.2*\% \text{ Si}.$$

6. The method of claim 3, wherein the Md30 temperature for the metastable steel is calculated according to the following equation:

$$Md30=413-462*(\% \text{ C}+\% \text{ N})-13.7*\% \text{ Cr}-8.1*\% \text{ Mn}-18.5*\% \text{ Mo}-9.5*\% \text{ Ni}-9.2*\% \text{ Si}.$$

7. The method of claim 1, 2, 3, 4, 5, or 6, further comprising the step of wherein after rolling, the metastable steel is further rolled at room temperature.

8. The method of claim 7, further comprising the step of wherein the metastable coated steel is annealed prior to being rolled at room temperature.

9. The method of claim 1, wherein the metallic coating comprises zinc, aluminum, or an alloy of one or more of them.

* * * * *